US011631872B2

(12) United States Patent
Song et al.

(10) Patent No.: US 11,631,872 B2
(45) Date of Patent: *Apr. 18, 2023

(54) SYSTEM AND METHOD FOR DETERMINING STATE OF CHARGE FOR AN ELECTRIC ENERGY STORAGE DEVICE

(71) Applicant: ESS TECH, INC., Wilsonville, OR (US)

(72) Inventors: Yang Song, West Linn, OR (US); Timothy J. McDonald, Portland, OR (US); Thiago Groberg, Tigard, OR (US)

(73) Assignee: ESS TECH, INC., Wilsonville, OR (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/099,191

(22) Filed: Nov. 16, 2020

(65) Prior Publication Data
US 2021/0075039 A1    Mar. 11, 2021

Related U.S. Application Data

(63) Continuation of application No. 16/179,665, filed on Nov. 2, 2018, now Pat. No. 10,879,544.

(51) Int. Cl.
| | |
|---|---|
| *H01M 8/04* | (2016.01) |
| *H01M 8/04537* | (2016.01) |
| *H01M 8/18* | (2006.01) |
| *H01M 8/04858* | (2016.01) |
| *H01M 8/04955* | (2016.01) |

(52) U.S. Cl.
CPC ... *H01M 8/04611* (2013.01); *H01M 8/04582* (2013.01); *H01M 8/04932* (2013.01); *H01M 8/04955* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 7,855,005 B2 | 12/2010 | Sahu | |
| 8,264,202 B2 * | 9/2012 | Sahu | ............... G01R 31/389 320/132 |
| 9,806,366 B2 | 10/2017 | Song et al. | |

(Continued)

FOREIGN PATENT DOCUMENTS

| | | |
|---|---|---|
| EP | 3258526 A1 | 12/2017 |
| KR | 20160071432 A | 6/2016 |

OTHER PUBLICATIONS

European Patent Office, Extended European Search Report Issued in Application No. 19879914.0, dated Dec. 13, 2021, Germany, 7 pages.

(Continued)

*Primary Examiner* — Wyatt P McConnell
(74) *Attorney, Agent, or Firm* — McCoy Russell LLP

(57) ABSTRACT

Systems and methods for operating an electric energy storage device are described. The systems and methods may generate a state of charge estimate that is based on negative electrode plating. An overall state of charge may be determined from the state of charge estimate that is based on negative electrode plating and a state of charge estimate that is not based on negative electrode plating.

20 Claims, 6 Drawing Sheets

(56) References Cited

U.S. PATENT DOCUMENTS

| | | |
|---|---|---|
| 10,811,993 B2 | 10/2020 | Vanderzaden |
| 2013/0029185 A1* | 1/2013 | Ridley .................. H01M 10/48 |
| | | 429/50 |
| 2016/0293991 A1 | 10/2016 | Goeltz et al. |
| 2020/0112040 A1 | 4/2020 | Walker-Stern et al. |
| 2020/0127466 A1 | 4/2020 | Vanderzanden et al. |

OTHER PUBLICATIONS

ISA Korean Intellectual Property Office, International Search Report and Written Opinion Issued in Application No. PCT/US2019/051331, dated Jan. 3, 2020, WIPO, 10 pages.

* cited by examiner

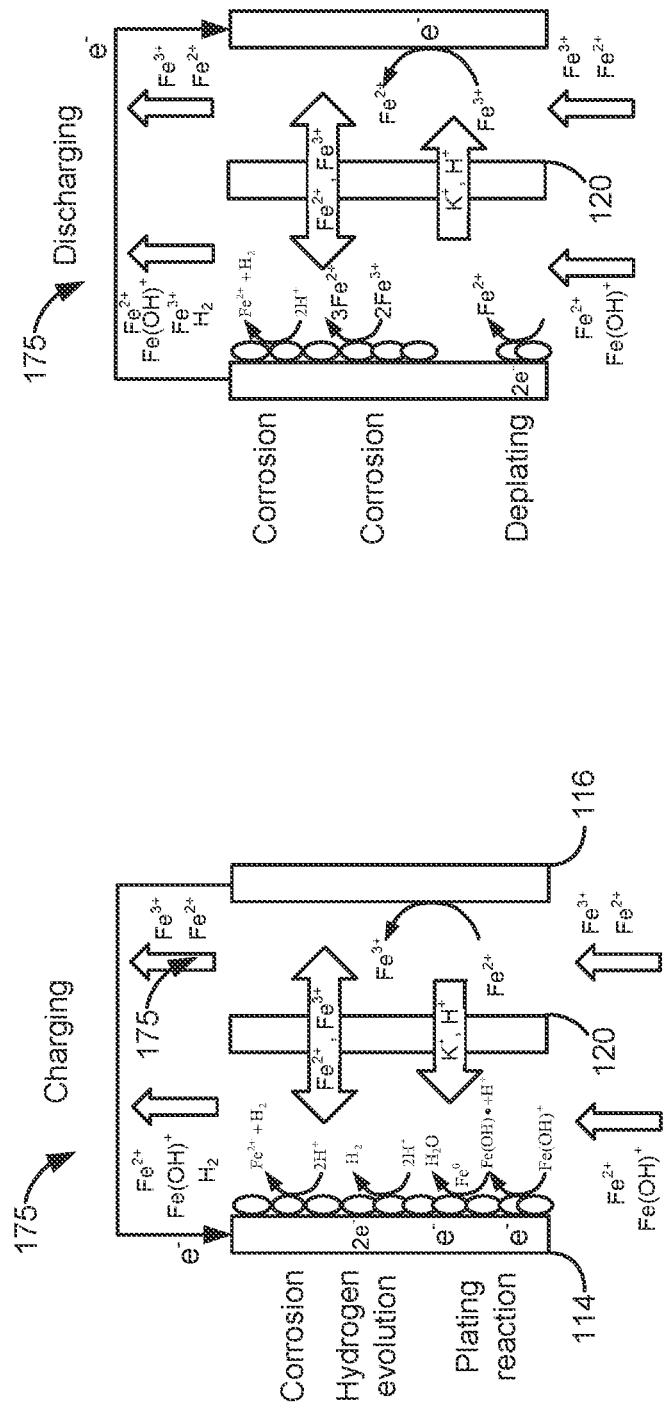

SYSTEM AND METHOD FOR DETERMINING STATE OF CHARGE FOR AN ELECTRIC ENERGY STORAGE DEVICE

CROSS-REFERENCE TO RELATED APPLICATIONS

The present application is a continuation of U.S. patent application Ser. No. 16/179,665 entitled "System and Method for Determining State of Charge for an Electric Energy Storage Device", filed on Nov. 2, 2018.

FIELD

The present description relates to a system and method for determining state of charge of an electric energy storage device. The methods and systems may be particularly useful for electrical power systems that include two electrolytes that are not in fluidic communication.

BACKGROUND AND SUMMARY

An oxidation-reduction flow battery may store electrical power that has been generated via an array of photovoltaic cells, wind turbines, hydroelectric generators, or other sources so that the electrical power may be delivered to electrical loads at a later time when output of the electrical power source may be low or when electrical loads are high. The oxidation-reduction flow battery stores electrical energy in chemical form in electrolyte and it also converts chemical energy into electrical energy via redox reactions that include the electrolyte. Because electric energy is stored in the electrolyte, the electric energy storage capacity of the oxidation-reduction flow battery may be changed by simply changing the volume of electrolyte stored within the oxidation-reduction flow battery. In addition, the total charge storage capacity of the oxidation-reduction flow battery may be determined from the volume of electrolyte in the oxidation-reduction flow battery system.

Electric energy storage system design requirements may be the basis for setting the total charge storage capacity of an oxidation-reduction flow battery, but it may also be desirable to determine a state of charge (SOC) for the oxidation-reduction flow battery. The SOC may be described as a ratio of an amount of electric charge stored in an electric energy storage device (e.g., an oxidation-reduction flow battery) to the full or total theoretical amount of electric charge that may be stored in the electric energy storage device. The SOC may be useful to decide when charging of an oxidation-reduction flow battery should be stopped or started. Further, the SOC may be useful to determine maximum rates of charging and discharging power for the oxidation-reduction flow battery at different SOC levels.

One way to estimate SOC for an oxidation-reduction flow battery is to measure positive electrolyte oxidation/reduction potential (ORP) as an indication of $Fe^{3+}$ ions in positive electrolyte as a measure of SOC. However, measuring ORP of positive electrolyte may not be as accurate as may be desired to determine SOC because negative electrode side reactions may offset the overall battery storage capacity from the positive state of charge. Therefore, it may be desirable to provide a way of determining SOC that takes into consideration negative side reactions and that better matches the actual battery storage capacity.

The inventors herein have recognized the above-mentioned issues and have developed a method for determining state of charge of an electric energy storage device, comprising: adjusting operation of an electric energy storage device via a controller according to a state of charge of the electric energy storage device, the state of charge generated via a plating efficiency of the electric energy storage device and a current flow of the electric energy storage device.

By determining a plating efficiency of an electric energy storage device, it may be possible to improve state of charge estimates for an oxidation-reduction flow battery. In particular, plating efficiency at the negative electrode may be indicative of a battery's capacity to source and sink current and the plating efficiency values may relate to side reactions at the negative electrode. As such, the plating efficiency may be useful to count coulombs entering and exiting an oxidation-reduction flow battery and to determine a SOC estimate for an oxidation-reduction flow battery.

The present description may provide several advantages. In particular, the approach may improve SOC estimates for an oxidation-reduction flow battery. Further, the approach may be useful to improve control of an oxidation-reduction flow battery. In addition, the approach may be useful to determine when it may be desirable to perform an oxidation-reduction flow battery cleansing procedure to improve battery cell efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 1B and 1C show schematics representations of charging and discharging reactions for an oxidation-reduction flow battery.

DETAILED DESCRIPTION

Figure 1A:
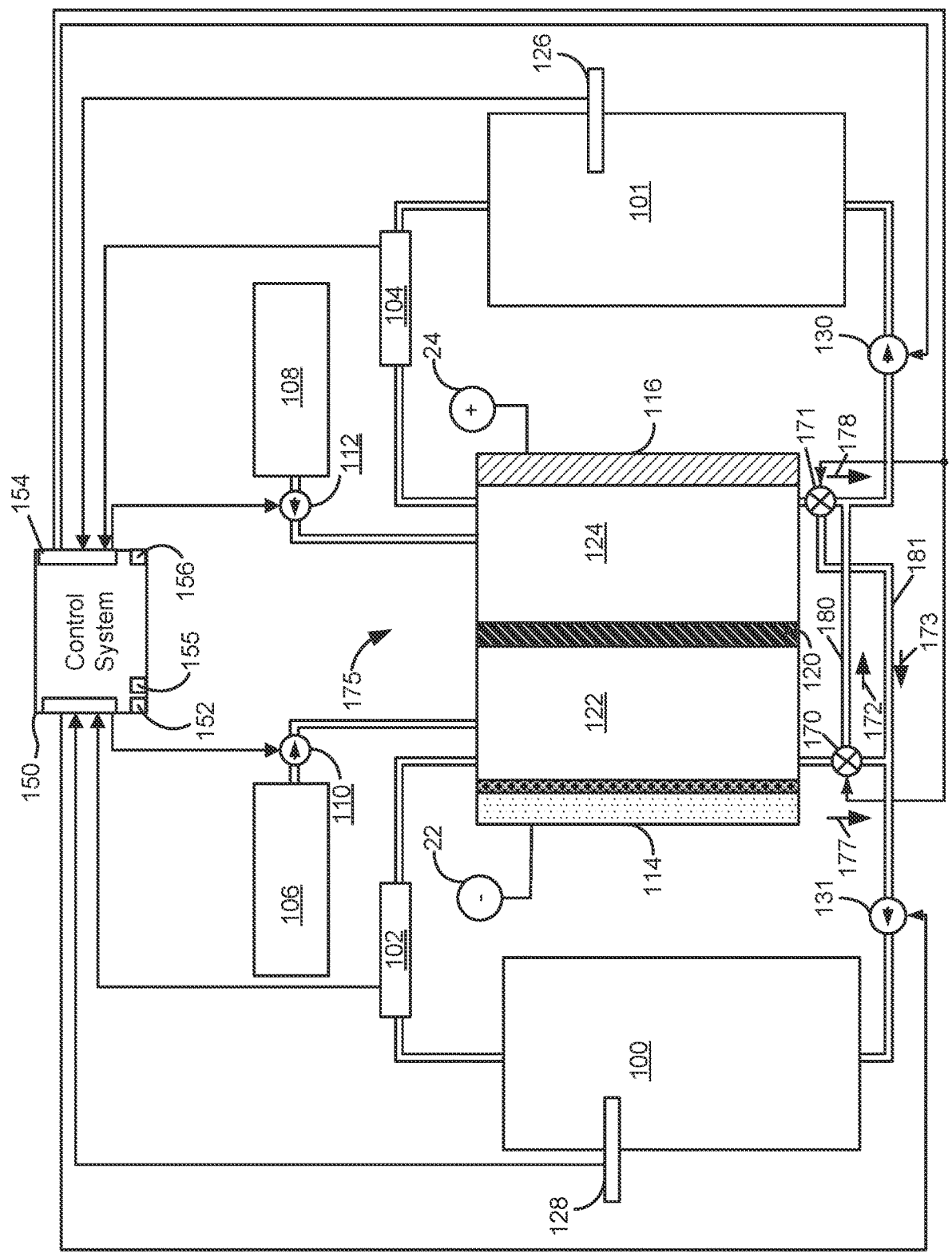
FIG. 1A is a schematic diagram showing a single cell of an electric power storage and delivery system.
Figure 2:
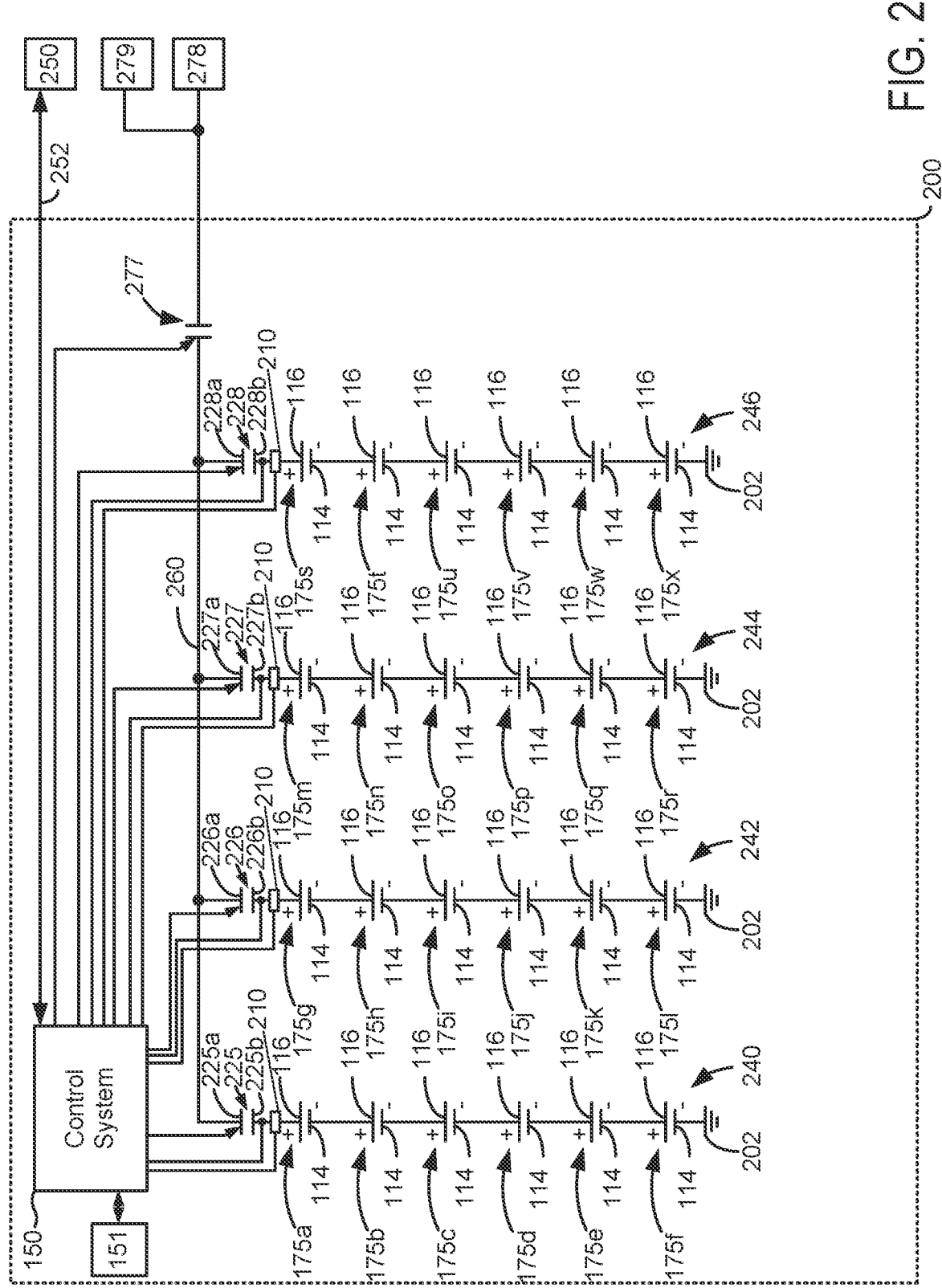
FIG. 2 is a schematic diagram of an electric power system that includes a plurality of cells.
Figure 3:
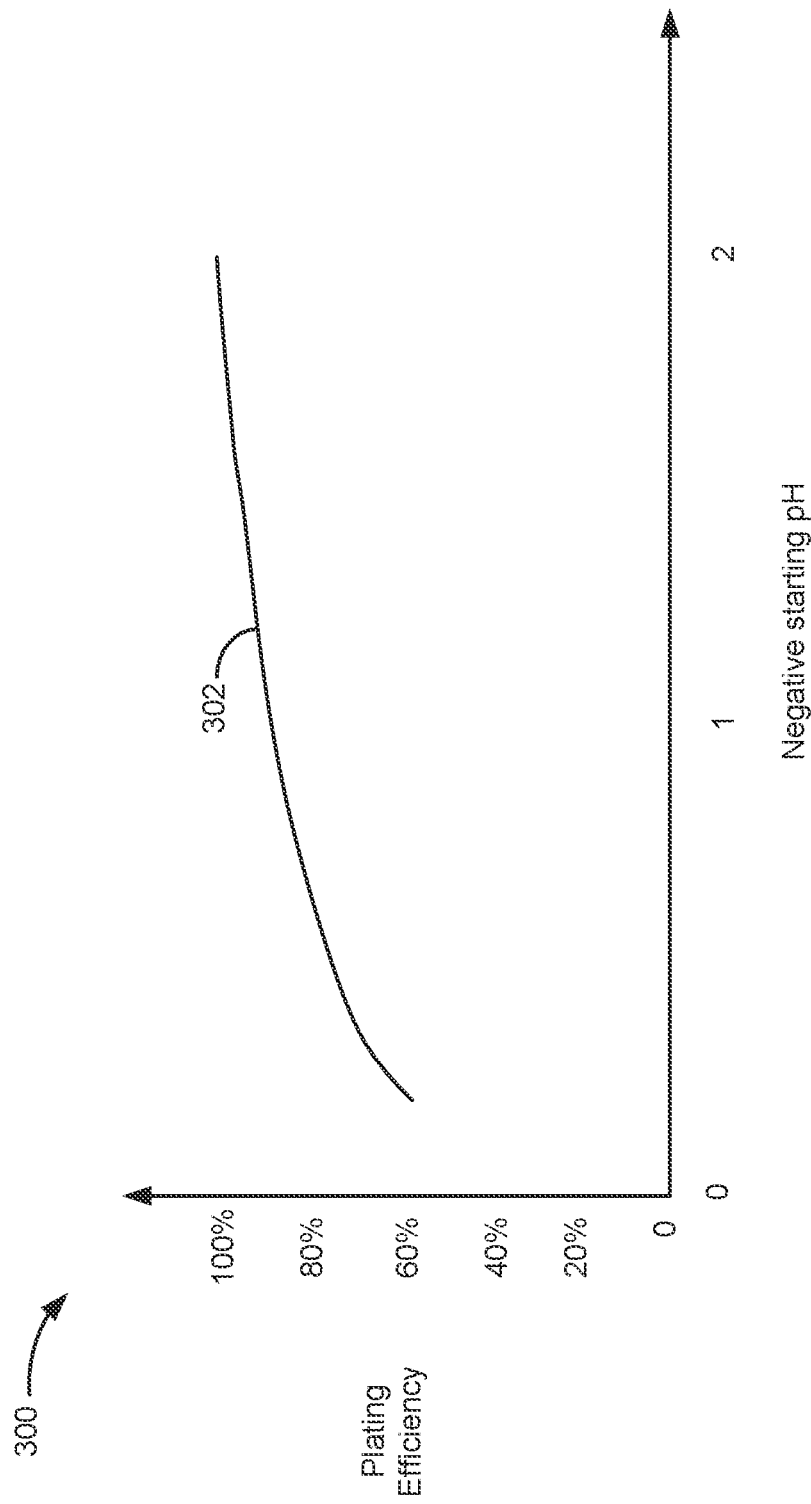
FIG. 3 shows an example plot of pH versus negative electrode plating efficiency.
Figure 4:
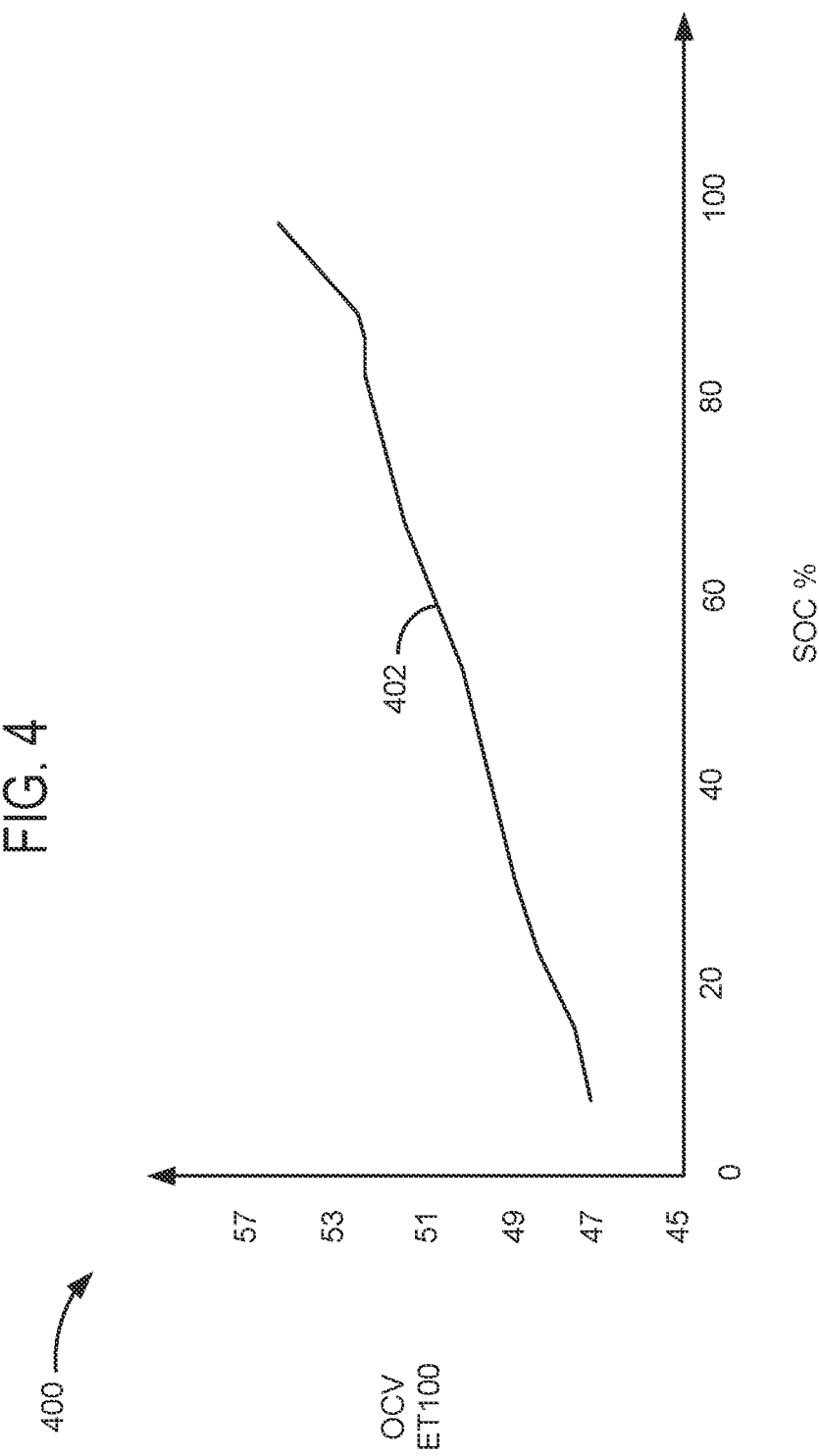
FIG. 4 shows an example plot of SOC versus open circuit voltage.
Figure 5:
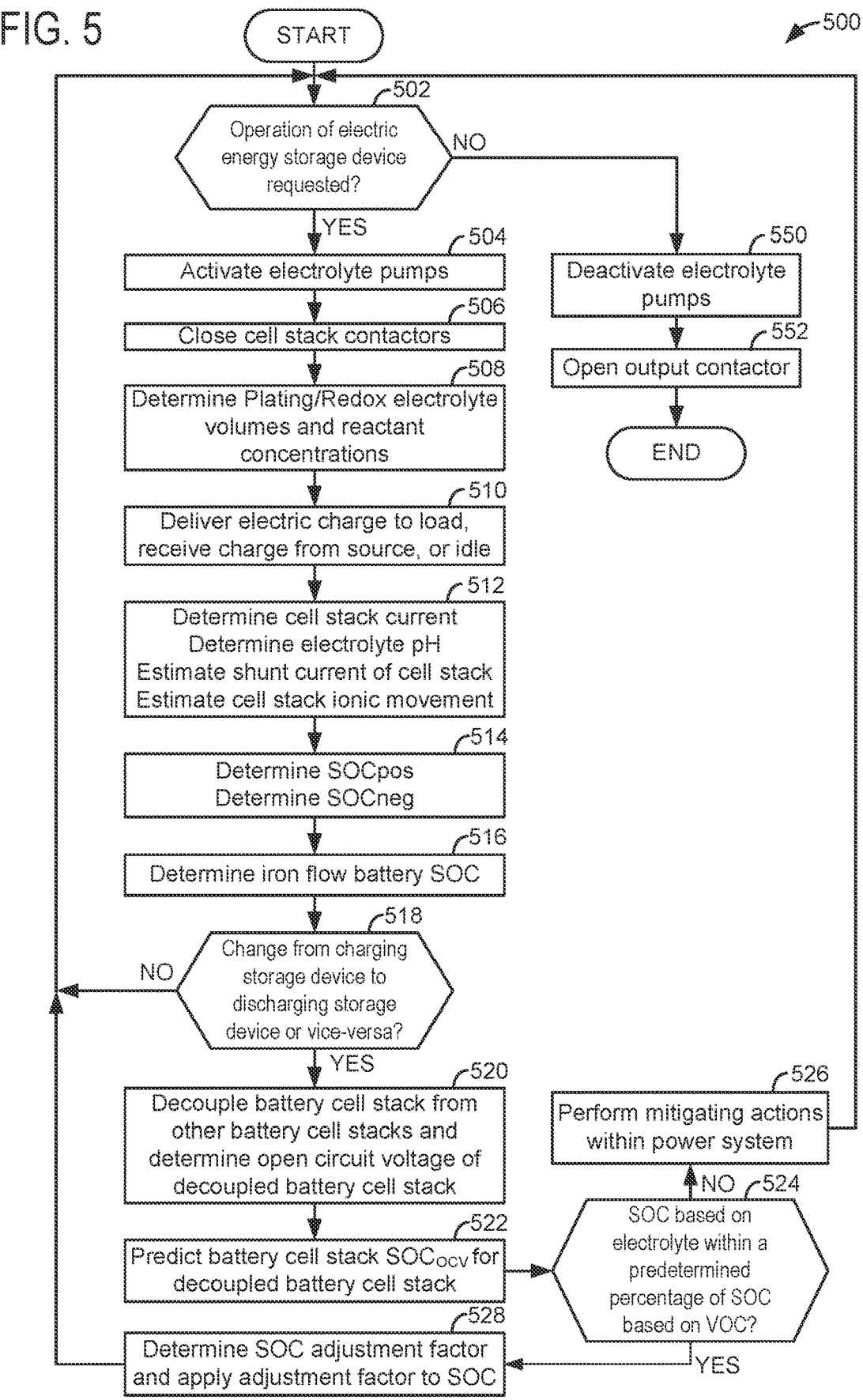
FIG. 5 shows a flowchart of an example method for determining SOC and applying results of a SOC estimate.

The present description is related to estimating state of charge (SOC) for an oxidation-reduction flow battery. One cell of an oxidation-reduction flow battery is shown in FIG. 1A. FIGS. 1B and 1C graphically illustrate chemical reactions that may occur within an oxidation-reduction flow battery cell shown in FIG. 1A. A plurality of oxidation-reduction flow battery cells may be arranged in series and parallel as shown in FIG. 2 to form an electric energy storage system. The electric energy storage system may communicate SOC values to external controllers so that external electric power sources and consumers may work efficiently with the electric energy storage system. A plot of electrolyte pH versus negative electrode plating efficiency is shown in FIG. 3. The relationship shown in FIG. 3 may be applied to estimate SOC of an oxidation-reduction flow battery. FIG. 4 shows a plot of SOC versus open circuit voltage (OCV). The relationship shown in FIG. 4 may be applied to verify estimates of SOC that are based on negative electrode plating efficiency. A method to determine SOC via negative electrode plating efficiency is shown in FIG. 5.

Referring to FIG. 1A, an example of an all iron redox flow battery (IFB) cell is shown. The IFB cell 175 is an electric energy storage device. In a redox flow battery system the negative electrode 114 may be referred to as the plating electrode and the positive electrode 116 may be referred to as the redox electrode. The negative electrolyte within the plating side (e.g., negative reactor 122) of the battery cell may be referred to as the plating electrolyte and the positive electrolyte on the redox side (e.g. positive reactor 124) of the battery may be referred to as the redox electrolyte.

The IFB cell may be supplied with plating electrolyte (e.g., $FeCl_2$, $FeCl_3$, $FeSO_4$, $Fe_2(SO_4)_3$, and the like)) that is stored in plating electrolyte tank 100. The IFB may also include redox electrolyte that is stored in redox electrolyte tank 101. The plating electrolyte and redox electrolyte may be a suitable salt dissolved in water, such as $FeCl_2$, $FeCl_3$, $FeSO_4$, $Fe_2(SO_4)_3$, and the like). Both the plating electrolyte and redox electrolyte may use the same salt at different molar concentrations, a feature of the IFB not available in batteries with different reactive compounds. Tank 100 may be in fluidic communication with negative reactor 122. Tank 101 may be in fluidic communication with positive reactor 124. Electrolyte in tank 100 and negative reactor 122 is in fluidic isolation from electrolyte in tank 101 and positive reactor 124. Separating the negative and positive reactors is barrier 120, which may comprise an electrically insulating ionic conducting barrier which prevents bulk mixing of the positive electrolyte and the negative electrolyte while allowing conductance of specific ions there through. The barrier 120 may be embodied as a membrane barrier, such as an ion exchange membrane or a microporous membrane, placed between the plating electrolyte and redox electrolyte to reduce electrolyte cross-over and provide ionic conductivity. The IFB cell 175 may further include negative battery terminal 22, and positive battery terminal 24 for supplying current to the IFB cell 175 during charging and for drawing current from the IFB cell 175 during discharging.

Sensors 102 and 104 may be used to determine the chemical properties of the electrolyte, including pH and may be embodied as an optical sensor. Probes 126 and 128 may additionally or alternatively be used to determine the chemical properties (discussed below) of the electrolytes. Other examples may have a plating electrolyte probe, plating electrolyte sensor, redox electrolyte probe, redox electrolyte sensor, or some combination thereof. The probe may also be placed inside the reacting portion of the IFB in negative reactor 122 and positive reactor 124. An acid additive may be stored in additional tanks 106 and 108. These may contain different additives and be controlled by different routines. In other examples, the IFB may also have either a positive side additive or a negative side additive and not both. The positive side additive may be accelerated into the positive reactor 124 by positive additive pump 112, the negative additive may be accelerated into the negative reactor 122 by negative additive pump 110. Alternately, the electrolyte additives may be pumped into tanks 100 and 101. Pumps 110 and 112 may be actuated via a control system 150 communicatively coupled to the pumps. The control system may be responsive to probe 126, probe 128, sensor 102, sensor 104, or any combination thereof. Electrolyte may be pumped to or from the negative reactor 122 by pump 131. Electrolyte may be pumped to or from the positive reactor 125 via pump 130. The IFB includes a negative electrode 114 and a positive electrode 116.

Control system 150 may include inputs and outputs 154 (e.g., digital inputs, digital outputs, analog inputs, analog outputs, pulse width outputs, etc.), a central processor 152, random-access memory 155, and read-only (e.g., non-transitory memory) 156. Control system 150 may receive data from the various sensors and actuators shown in FIGS. 1A and 2. Further, control system 150 may adjust the actuators of FIGS. 1A and 2 to alter states of devices and electrolyte in the physical world. Control system 150 may receive data and instructions from human/machine interface 151 (e.g., display panel, keyboard, pushbuttons, etc.). Further, control system 150 may send data to human/machine interface 151 and external controller 250.

During normal operation (e.g., not during a cleansing cycle), first three-way valve 170 prevents flow of plating electrolyte through bypass passage 180 and permits flow of plating electrolyte from negative reactor 122 to pump 131 as indicated by arrow 177. Similarly, during normal operation, second three-way valve 171 prevents flow of redox electrolyte through bypass passage 181 and permits flow of redox electrolyte from positive reactor 124 to pump 130 as indicated by arrow 178. Thus, plating electrolyte is separated and isolated from redox electrolyte.

During a cleansing cycle, it may be desirable to mix plating electrolyte with redox electrolyte. The mixing may be accomplished via positioning first three-way valve 170 and second three-way valve 171 to second positions. While operating in their second positions, first valve 170 permits plating electrolyte to flow through bypass passage 180 as indicated by arrow 172 and prevents plating electrolyte from flowing from negative reactor 122 to pump 131. Similarly, while in a second position, second valve 171 permits plating electrolyte to flow through bypass passage 181 as indicated by arrow 173 and prevents plating electrolyte from flowing from positive reactor 124 to pump 130. Valves 170 and 171 may be adjusted between first and second positions via controller 150.

Referring now to FIGS. 1B and 1C, graphic representations of electrochemical reactions that may take place in an electric energy storage device such as the IFB cell 175 of the electric power and storage delivery system of FIG. 1A is shown. For example, FIGS. 1B and 1C depict the electrochemical reactions occurring at or in the vicinity of the negative electrode 114 (in the negative reactor 122) and positive electrode 116 (in the positive reactor 124) of IFB cell 175.

As illustrated in FIG. 1B, ferrous ion, $Fe^{2+}$ receives two electrons and plates as iron metal on to the negative electrode 114 via a plating reaction, while at the positive electrode 116, $Fe^{2+}$ loses an electron to form ferric ion, $Fe^{3+}$, during charging. In contrast, as shown in FIG. 1C, iron metal, $Fe^0$ at the negative electrode 114 loses two electrons and re-dissolves as $Fe^{2+}$ during discharging, while at the positive electrode 116, $Fe^{3+}$ gains an electron to form $Fe^{2+}$. The electrochemical reactions are summarized in chemical equations (1) and (2), wherein the forward reactions (left to right) indicate electrochemical reactions during charging, while the reverse reactions (right to left) indicate electrochemical reactions during discharging:

$$Fe^{2+} + 2e^- \leftrightarrow Fe^0 -0.44 \text{ V(Negative Electrode)} \quad (1)$$

$$2Fe^{2+} \leftrightarrow 2Fe^{3+} + 2e^- +0.77 \text{ V(Positive Electrode)} \quad (2)$$

The negative electrolyte supplied to the IFB cell 175 may provide a sufficient amount of $Fe^{2+}$ so that, during charge, $Fe^{2+}$ can accept two electrons from the negative electrode to form $Fe^0$ and plate onto a substrate. During discharging, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB cell 175, the electrolyte may provide $Fe^{2+}$ during charging which loses electron and oxidizes to $Fe^{3+}$. During discharging, $Fe^{3+}$ provided by the electrolyte becomes $Fe^{2+}$ by absorbing an electron provided by the electrode. The equilibrium potential of this reaction is +0.77V, creating a positive terminal for the desired system.

Charging is achieved by applying a current across the electrodes via negative and positive terminals 22 and 24. The negative electrode 114 may be coupled via negative terminal 22 to the negative side of a voltage source so that electrons may be delivered to the negative electrolyte via the positive electrode 116 (e.g., as $Fe^{2+}$ is oxidized to $Fe^{3+}$ in the positive electrolyte in the positive reactor 124). The electrons provided to the negative electrode 114 (e.g., plating electrode) can reduce the $Fe^{2+}$ in the negative electrolyte to form $Fe^0$ at the plating substrate causing it to plate onto the negative electrode 114.

Discharging can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive reactor 124 to provide additional $Fe^{3+}$ ions via redox electrolyte tank 101. More commonly, availability of $Fe^0$ during discharge may be an issue in IFB systems, wherein the $Fe^0$ available for discharge may be proportional to the surface area and volume of the negative electrode substrate as well as the plating efficiency. Charging capacity may be dependent on the availability of $Fe^{2+}$ in the negative reactor 122. As an example, $Fe^{2+}$ availability can be maintained by providing additional $Fe^{2+}$ ions via plating electrolyte tank 100 to increase the concentration or the volume of the negative electrolyte to the negative reactor 122.

In an IFB, the positive electrolyte comprises ferrous ion, ferric ion, ferric complexes, or any combination thereof, while the negative electrolyte comprises ferrous ion or ferrous complexes, depending on the state of charge of the IFB system. Utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the barrier 120 (e.g., ion-exchange membrane barrier, micro-porous membrane, and the like). For example, ferric ions in the positive electrolyte may be driven toward the negative electrolyte by a ferric ion concentration gradient and an electrophoretic force across the barrier 120. Subsequently, ferric ions penetrating the barrier 120 and crossing over to the negative reactor 122 may result in coulombic efficiency losses. Ferric ions crossing over from the low pH redox side (e.g., more acidic positive reactor 124) to high pH plating side (e.g., less acidic negative reactor 122) can result in precipitation of $Fe(OH)_3$. Precipitation of $Fe(OH)_3$ can damage the barrier 120 and cause permanent IFB cell performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, ohmic resistance across the barrier 120 may rise over time and battery performance may degrade.

Additional coulombic efficiency losses may be caused by reduction of $H^+$ (e.g., protons) and subsequent formation of $H_2$ (e.g., hydrogen gas), and the reaction of protons in the negative reactor 122 with electrons supplied at the plated iron metal electrode 114 to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

During charge of an IFB, for example, ferrous ion, $Fe^{2+}$, is reduced (accepts two electrons in a redox reaction) to metal iron, $Fe^0$, at the negative electrode. Simultaneously, at the positive electrode, ferrous ion, $Fe^{2+}$, is oxidized (loss of an electron) to ferric ion, $Fe^{3+}$. Concurrently, at the negative electrode, the ferrous iron reduction reaction competes with the reduction of protons, $H^+$, wherein two protons each accept a single electron to form hydrogen gas, $H_2$ and the corrosion of iron metal to produce ferrous ion, $Fe^{2+}$. The production of hydrogen gas through reduction of hydrogen protons and the corrosion of iron metal are shown in chemical equations (3) and (4), respectively:

$$H^+ + e^- \leftrightarrow \frac{1}{2}H_2 \quad \text{(proton reduction)} \quad (3)$$

$$Fe^0 + 2H^+ \leftrightarrow Fe^{2+} + H_2 \quad \text{(iron corrosion)} \quad (4)$$

As a result, the negative electrolyte in the negative reactor 122 tends to stabilize at a pH range between 3 and 6. At the positive reactor 124, ferric ion, $Fe^{3+}$, has a much lower acid disassociation constant (pKa) than that of ferrous ion, $Fe^{2+}$. Therefore, as more ferrous ions are oxidized to ferric ions, the positive electrolyte tends to stabilize at a pH less than 2, in particular at a pH closer to 1.

Accordingly, maintaining the positive electrolyte pH in a first range in which the positive electrolyte (positive reactor 124) remains stable and maintaining the negative electrolyte pH in a second range in which the negative electrolyte (negative reactor 122) remains stable may reduce low cycling performance and increase efficiency of redox flow batteries. For example, maintaining a pH of a negative electrolyte in an IFB cell between 3 and 4 may reduce iron corrosion reactions and increase iron plating efficiency, while maintaining a pH of a positive electrolyte less than 2, in particular less than 1, may promote the ferric/ferrous ion redox reaction and reduce ferric hydroxide formation.

As indicated by chemical equations (3) and (4), evolution of hydrogen can cause electrolyte imbalance in a redox flow battery system. For example, during charge, electrons flowing from the positive electrode to the negative electrode (e.g., as a result of ferrous ion oxidation), may be consumed by hydrogen evolution via chemical equation (3), thereby reducing the electrons available for plating given by chemical equation (1). Because of the reduced plating, battery charge capacity is reduced. Additionally, corrosion of the iron metal further reduces battery capacity since a decreased amount of iron metal is available for battery discharge. Thus, an imbalanced electrolyte state of charge between the positive reactor 124 and the negative reactor 122 can develop as a result of hydrogen production via chemical reactions (3) and (4). Furthermore, hydrogen gas production resulting from iron metal corrosion and proton reduction both consume protons, which can result in a pH increase of the negative electrolyte. As discussed above, an increase in pH may destabilize the electrolyte in the redox batter flow system, resulting in further battery capacity and efficiency losses.

Referring now to FIG. 2, a schematic block diagram of an electric power system 200 that includes a plurality of the IFB cells 175a-175x and controller 150. Controller 150 may read voltage levels of electric energy storage cell stacks 240-246 and current flow through electric energy storage cell stacks 240-246 via sensors 210. Controller 150 may also selectively operate contactors 225-228 and main contactor 277. Controller 150 may communicate data (e.g., SOC values) to external controller 250 via network (e.g., local area network (LAN), controller area network (CAN), or other known network) so that external controller 250 may operate external electric power consumers 278 and sources 279 in conjunction with operation of electric energy storage system 200. Electric power system 200 includes all of the components shown in FIG. 1A.

IFB cells 175a-175x are the same as cell 175 shown in FIG. 1A. The letter designations are provided simply to identify individual electric energy storage cells. IFB cells 175a-175f are arranged in a first cell stack 240. IFB cells 175g-175l are arranged in a second cell stack 242. IFB cells 175m-175r are arranged in a third cell stack 244. IFB cells 175s-175x are arranged in a fourth cell stack 246. Although FIG. 2 shows four cell stacks in electric energy storage system 200, electric energy storage system 200 is not limited to four electric energy storage cell stacks. Rather, electric energy storage system 200 may include from 1 to N electric energy storage cell stacks, where N is an integer number. Further, each electric energy storage cell stack shown in FIG. 2 includes six electric energy storage cells (e.g., 175a-175f). However, electric energy storage system 200 is not limited to six electric energy storage cells in each electric energy storage cell stacks. Rather, electric energy storage system 200 may include from 1 to M electric energy storage cells in an electric energy storage cell stack, where M is an integer number. Each of electric energy storage cells 175a-175x includes a positive side 116 and a negative side 114.

Each electric energy storage cell stacks 201-204 includes a contactor 220-223 for selectively individually coupling and decoupling electric energy storage cell stacks 201-204 to electric power conductor or bus 260. Contactor 225 includes a first side 225a, which is directly coupled to electric power conductor 260, and a second side 225b, which is directly coupled to electric energy storage cell stack 240. Likewise, contactors 226-228 include first sides 226a-228a, which are directly coupled to electric power conductor 260, and second sides 226b-228b, which are directly coupled to electric energy storage cell stacks 242-246. Contactors 225-228 may be open (e.g., not allowing current to flow through the contactor) when electric energy storage system 200 is deactivated. Further, contactors 225-228 may be individually opened and closed (e.g., allowing current flow through the contactor) to selectively electrically isolate selected electric energy storage cell stacks 240-246 from electric power conductor 260 when one or more of electric energy storage cells 175a-175x are cleansed. Contactors 225-228 may be selectively opened and closed via controller 150.

Electric energy storage cell stack 240 may be solely discharged to electric power consumer via closing contactor 225, closing main contactor 277, and opening contactors 226-228. Likewise, electric energy storage cell stacks 242-246 may be solely charged or discharged via closing one of contactors 226-228, closing main contactor 277, and opening the other contactors 226-228.

Electric energy storage system 200 also includes a main contactor 277 that may be opened and closed via controller 150. Main contactor 277 may be closed to electrically couple electric power conductor 260 to external electric energy sources (e.g., photovoltaic cells, wind turbines, hydroelectric generators, etc.) 279 and electrical energy consumers (e.g., house hold appliances, industrial motors, vehicle propulsion sources, etc.) 278. Main contactor 277 may be opened to electrically isolate IFB cell electric energy power conductor 260 from electrical energy sources 279 and electrical energy consumers 278. Electrical energy sources 279 and electrical energy consumers 278 are external to electric energy storage system 200.

Thus, the system of FIGS. 1A and 2 provides for an electric power system, comprising: an iron flow electric energy storage cell stack including a positive electrode and a negative electrode, the positive electrode in physical communication with a first electrolyte (e.g., redox electrolyte) and the negative electrode in physical communication with a second electrolyte (e.g., plating electrolyte); and a controller including executable instructions stored in non-transitory memory to generate a first state of charge via a plating efficiency and to generate a second state of charge from other than the plating efficiency, and instructions to generate a charging state of charge via selecting a greater of the first state of charge and the second state of charge during charging of the iron flow electric energy storage cell. The electric power system further comprises additional instructions to generate a discharging state of charge via selecting a lesser of the first state of charge and the second state of charge during discharging of the iron flow electric energy storage cell. The electric power system further comprises additional instructions to multiply the plating efficiency and current of the iron flow electric energy storage cell stack. The electric power system further comprises additional instructions to generate a correction factor from the charging state of charge and an open circuit state of charge estimate. The electric power system further comprises additional instructions to multiply the correction factor and the charging state of charge. The electric power system includes where the iron flow electric energy storage cell stack includes a membrane that physically separates and isolates the first electrolyte from the second electrolyte.

Referring now to FIG. 3, a plot 300 that illustrates an example relationship between plating electrolyte pH and negative electrode plating efficiency is shown. The plot represents a function that outputs a negative electrode plating efficiency. The function may be referenced or indexed via plating electrolyte pH.

The vertical axis represents negative electrolyte plating efficiency and negative electrolyte plating efficiency increases in the direction of the vertical axis arrow. The horizontal axis represents plating electrolyte pH and plating electrolyte pH increases in the direction of the horizontal axis arrow.

Curve 302 represents the relationship between plating electrolyte pH and negative electrode plating efficiency, which may be referred to as the coulombic efficiency for the negative plating reaction. In one example, curve 302 may be expressed as:

$$Plate_{eff} = 0.138 \cdot ln(pH) + 0.8514$$

where $Plate_{eff}$ is the plating efficiency of the negative electrode, ln is the natural logarithm, and pH is the pH value of the plating electrolyte.

In one example, the plating efficiency may be empirically determined via adjusting the pH of the plating electrolyte and determining the plating efficiency for each pH value during charging of the iron flow electric energy storage cell. The plating efficiency may be determined via dividing the actual weight of metal deposited to the negative electrode during charging of the iron flow electric energy storage cell by the theoretical weight of metal that would be deposited to the negative electrode during charging of the iron flow electric energy storage cell according to Faraday's law.

Referring now to FIG. 4, a plot 400 that illustrates an example relationship between battery SOC and open circuit voltage (OCV) at ET100 is shown. ET100 represents the battery voltage measured at positive and negative bus bars. The plot represents a function that outputs SOC for a battery. The function may be referenced or indexed via OCV (e.g., voltage of the IFB cell or cell stack when the IFB cell or cell stack is disconnected from external electric loads).

The vertical axis represents plating OCV and OCV increases in the direction of the vertical axis arrow. The horizontal axis represents SOC % and SOC % increases in the direction of the horizontal axis arrow.

Curve 402 represents the relationship between SOC % and OCV. In one example, curve 402 may be expressed as:

$$SOC_{OCV} = -0.518 \cdot (OCV_{ET100})^2 + 67.098(OCV_{ET100}) - 2010.7$$

where $SOC_{OCV}$ is the battery SOC determined from OCV and $OCV_{ET100}$ is the open circuit voltage at ET100 of the selected battery.

In one example, the SOC and OCV relationship may be empirically determined via measuring the OCV and then fully discharging the battery while measuring the amount of charge that leaves the battery during the discharge process. The amount of charge that exits the battery during the discharge process divided by theoretical amount of charge the battery may store indicates the SOC for the particular OCV.

Referring now to FIG. 5, a method for operating the electric energy system as shown in FIGS. 1A and 2 is shown. The method of FIG. 5 may be included as executable instructions stored in non-transitory memory of the system of FIGS. 1A and 2. In addition, the method of FIG. 5 may work in cooperation with the system of FIGS. 1A and 2 to receive data and adjust actuators of the control the system in FIGS. 1A and 2. Further, the method of FIG. 5 may communicate with external systems in the physical or real world via the system of FIGS. 1A and 2. The method of FIG. 5 describes determining SOC for individual electric energy storage device cell stacks within an electric energy storage system, but the method described herein may be applied to an entire electric energy storage system or individual cells.

At 502, method 500 judges if operation of the electric energy storage system of FIGS. 1A and 2 is requested. Operation of the electric energy storage system may be requested via human input or via input from an external controller. If a request to operate the electric energy storage system has been generated, the answer is yes and method 500 proceeds to 504. Otherwise, the answer is no and method 500 proceeds to 550.

At 550, method 500 deactivates electrolyte pumps (e.g., 130 and 131 of FIG. 1A). The electrolyte pumps may be deactivated to conserve energy. Method 500 proceeds to 552.

At 552, method 500 opens the main contactor (e.g., 277 of FIG. 1A) so that the electric energy storage system is electrically decoupled from and electrically isolated from external electric power sources and electric power consumers. Method 500 proceeds to exit.

At 504, method 500 activates electrolyte pumps (e.g., 130 and 131 of FIG. 1A). The electrolyte pumps are activated to allow electrolyte to flow between storage tanks and reaction cells. Method 500 proceeds to 506.

At 506, method 500 closes the individual cell stack contactors (e.g., 225-228 of FIG. 1A) so that the electric energy storage system may be electrically coupled to an internal voltage bus within the electric energy storage system. Method 500 proceeds to 508.

At 508, method 500 determines plating electrolyte and redox electrolyte volumes and concentrations. Plating and redox electrolyte volumes may be stored in controller memory and retrieved from controller memory. Alternatively, plating electrolyte and redox electrolyte volumes may be determined via level sensors. Concentrations of plating electrolytes and redox electrolytes may be determined from the amounts of additives in the respective electrolytes. Alternatively, concentrations of the respective electrolytes may be determined via sensor output. Method 500 proceeds to 510.

At 510, method 500 begins to receive charge from external power sources to the electric energy storage system. Alternatively, method 500 may begin to supply charge from the electric energy storage system to external electric power consumers. Method 500 may begin receiving or sourcing electric power after issuing an active signal to an external controller and/or via closing one or more contactors (e.g., main contactor 277). Method 500 proceeds to 512.

At 512, method 500 determines battery cell stack current. Method 500 may determine current entering or exiting a particular electric energy storage cell stack (e.g., 240-246 of FIG. 2) via output of a current sensor. Method 500 also determines pH of electrolyte in positive and negative reactors via pH sensor output received to the control system. Method 500 also determines shunt current within the electric energy storage device cell stack. The shunt current may be empirically determined. In one example, the shunt current in the electric energy storage cell stack may be empirically determined via measuring battery capacity loss over idling conditions where no external current was applied, but all battery cells were connected via electrolyte shunt path.

Method 500 also determines ionic movement within the electric energy storage device cell stack. The ionic movement may be empirically determined. In one example, the ionic movement in the electric energy storage cell stack may be empirically determined via ex-situ measurement of electrolyte ionic concentrations via ion chromatography. Method 500 proceeds to 514.

At 514, method 500 determines SOC values for the electric energy storage device positive and negative electrolytes via the following equations:

$$SOC_{pos} = \frac{\sum_{i=0}^{n}\left(\frac{IT100}{F} - \frac{I_{s,pos,i}}{F} - A_a N_{Fe3+}\right)\Delta t_i}{V_{pos,0}[Fe^{2+}]_0 + \sum_{i=0}^{n}[-(N_{Fe2+} + N_{Fe3+})A_a \Delta t_i]}$$

$$SOC_{neg} = \frac{\sum_{i=0}^{n}\left(\frac{IT100*\eta}{2F} - \frac{I_{s,neg,i}}{2F} - \frac{1}{2}A_a N_{Fe3+}\right)\Delta t_i}{V_{neg,0}[Fe^{2+}]_0 + \sum_{i=0}^{n}\left[\left(N_{Fe2+} + \frac{3}{2}N_{Fe3+}\right)A_a \Delta t_i\right]}$$

where SOCpos is SOC based on positive electrolyte, n is the number of steps in the summation during the time interval in which SOC is estimated, IT100 is the total current flow through the electric energy cell stack during the time interval in which SOC is estimated, F is Faraday's number, $I_{s,pos,i}$ is the total shunt current for the positive electrolyte during the time interval in which SOC is estimated, $A_a$ is the iron flow battery system active area, $N_{Fe3+}$ is the flux density for ferric ions from the positive electrolyte to the negative electrolyte, $\Delta t_i$ is the time interval between steps, $V_{pos,0}$ is the initial volume of the positive electrolyte, $[Fe^{2+}]_0$ is the initial concentration of ferrous ions in the positive and negative electrolytes, $N_{Fe2+}$ is the flux density for ferrous ions from the positive electrolyte to the negative electrolyte, SOCneg is SOC based on negative electrolyte, η is the coulombic efficiency for the negative plating reaction, $I_{s,neg,i}$ is the total shunt current for the negative electrolyte during the time interval in which SOC is estimated, and $V_{neg,0}$ is the initial volume of the negative electrolyte. Method 500 proceeds to 516.

At 516, method 500 determines the electric energy storage device cell stack SOC. During charging of the electric energy storage device cell stack, the SOC is given by:

SOC=max(SOCpos,SOCneg)

where max is a function that returns the greater value of arguments SOCpos and SOCneg. During discharging of the of the electric energy storage device cell stack, the SOC is given by:

SOC=min(SOCpos,SOCneg)

where min is a function that returns the lesser value of arguments SOCpos and SOCneg. These SOC values are SOC values that are based on electrolyte. Method 500 proceeds to 518.

At 518, method 500 judges if there is a change from charging the electric energy cell stack to discharging the electric energy cell stack, or vice-versa. If so, the answer is yes and method 500 proceeds to 520. Otherwise, method 500 returns to 502. The change in operation from charging to discharging, or vice-versa, provides an opportunity to determine an open circuit voltage of the electric energy storage device cell stack without interrupting operation of the cell stack. As examples, the controller may switch from charging the electric energy cell stack to discharging the electric energy cell stack when a SOC increases above an upper threshold SOC during charging. Similarly, the controller may switch from discharging the electric energy cell stack to charging the electric energy cell stack when a SOC decreases below a lower threshold SOC while discharging. Alternatively, a microgrid controller may demand that the electric energy storage system to go from discharging to charging, or vice-versa. The upper threshold SOC and lower threshold SOC may be predetermined quantities, and may correspond to when the electric energy cell stack is charged to capacity and fully discharged, respectively.

At 520, method 500 electrically decouples the electric energy cell stack from the electric power conductor 260, other cell stacks, and external electric power supplies and consumers for at least 30 seconds. Method 500 also determines an open circuit voltage of the electric energy cell stack once the electric energy cell stack is decoupled from the electric power conductor 260. Method 500 may decouple the electric energy cell stack via opening a contactor (e.g., contactor 225 of FIG. 2). The voltage of the electric energy storage cell stack is determined via the controller. Method 500 proceeds to 522.

At 522, method 500 determines the $SOC_{ocv}$ (state of charge based on open circuit voltage) via a function that relates SOC to open circuit voltage of the electric energy device cell stack. An example of such a function is illustrated in FIG. 4. Method 500 references the function and determines the $SOC_{ocv}$ value. Method 500 proceeds to 524.

At 524, method 500 judges if SOC based on electrolyte is within a predetermined percentage of $SOC_{OCV}$. In one example, if SOC determined at 516 is within 10% of $SOC_{OCV}$, then the answer is yes and method 500 proceeds to 528. Otherwise, the answer is no and method 500 proceeds to 526.

At 528, method 500 determines a SOC adjustment factor. In one example, the adjustment factor may be determined via the following equation:

$$SOCAdj = \frac{SOC}{SOC_{OCV}}$$

where SOCAdj is the SOC adjustment factor, SOC is the SOC determined at 516, and $SOC_{OCV}$ is the SOC based on OCV as determined at 522. Method 500 may communicate SOC values during charging and discharging cycles to an external controller and/or a human/machine interface after multiplying SOC determined at 516 by SOCAdj and determining an adjusted SOC that is communicated to external devices. Method 500 returns to 502.

At 526, method 500 may perform mitigating actions to improve SOC estimates. In one example, performing mitigating actions may include requesting and carrying out a cleansing of the electric energy storage device cell stack. The cleansing cycle may include fully discharging the electric energy storage device to an external or internal load and then mixing plating electrolyte with redox electrolyte. The electric energy storage device cell stack may be discharged via closing a contactor of the electric energy storage device (e.g., 225), closing the main contactor (e.g., 277), and supplying charge to an external electric load (e.g., 278). Method 500 may also communicate the status of the electric energy storage device cell stack to an external controller via a communication network (e.g., LAN or WiFi). Mixing of the electrolytes during the cleansing procedure may be performed as previously described. Method 500 returns to 502 after performing the cleansing procedure.

Thus, the method of FIG. 5 provides for a method for determining state of charge of an electric energy storage device, comprising: adjusting operation of an electric energy storage device via a controller according to a state of charge of the electric energy storage device, the state of charge generated via a plating efficiency of the electric energy storage device and a current flow of the electric energy storage device. The method includes where adjusting operation of the electric energy storage device includes performing a cleansing cycle on the electric energy storage device, and where generating the state of charge includes multiplying the plating efficiency and the current flow. The method includes where performing the cleansing cycle includes discharging the electric energy storage device and mixing negative electrolyte with positive electrolyte. The method includes where adjusting operation of the electrical energy storage device includes communicating the state of charge of the electrical energy storage device to a controller that is external from the electrical energy storage device.

In some examples, the method includes where the state of charge of the electrical energy storage device that is further generated via subtracting a shunting current of the electrical energy storage device from a result of multiplying the plating efficiency of the electric energy storage device and the current flow of the electric energy storage device. The method includes where the plating efficiency is estimated via a pH level of an electrolyte of the electrical energy storage device. The method includes where the electrical energy storage device is an iron flow battery. The method includes where the state of charge generated via multiplying a plating efficiency of the electric energy storage device and the current flow of the electric energy storage device is a state of charge for a negative electrolyte of the electric energy storage device.

The method of FIG. 5 also provides for a method for determining state of charge of an electric energy storage device, comprising: adjusting operation of an electric energy storage device via a controller according to result of a comparison of a difference between a first state of charge of the electric energy storage device that is generated via a plating efficiency of the electric energy storage device and a third state of charge of the electric energy storage device that is generated via an open circuit voltage of the electric energy storage device. The method further comprises generating a second state of charge of the electric energy storage device that is generated without the plating efficiency and without the open circuit voltage. The method includes where the second state of charge is generated via subtracting a shunt current from a current flow of the electric energy storage device.

In some examples, the method further comprises generating a charging state of charge during charging of the electric energy storage device via selecting a greater of the first state of charge and the second state of charge. The method further comprises generating a discharging state of charge during discharging of the electric energy storage device via selecting a lesser of the first state of charge and the second state of charge. The method further comprises generating a correction factor and applying the correction factor to the first state of charge when a result of the comparison is less than a threshold value.

Note that the example control and estimation routines included herein can be used with various power conversion system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various described hardware components in combination with one or more controllers.

This concludes the description. The reading of it by those skilled in the art would bring to mind many alterations and modifications without departing from the spirit and the scope of the description. For example, different components within the power system may be electrically coupled to earth ground and the first and second electrolytes to reduce electrical potentials between an electric power system and earth ground.

The invention claimed is:

1. A method, comprising:
 operating an all-iron redox flow battery to generate a state of charge; and
 adjusting, with an electronic control system having instructions stored therein, operation of the flow battery according to the state of charge, the state of charge determined based on a parameter indicative of plating efficiency at a negative electrode, the parameter further indicating the flow battery's capacity to source and sink current.

2. The method of claim 1, where adjusting operation of the flow battery includes performing a cleansing cycle on the flow battery.

3. The method of claim 1, where the flow battery includes a tank storing a plating electrolyte.

4. The method of claim 2, where performing the cleansing cycle includes discharging the flow battery and mixing negative electrolyte with positive electrolyte.

5. The method of claim 1, where the state of charge is further determined based on subtracting a shunting current of the flow battery from a result of multiplying plating efficiency and the current flow.

6. The method of claim 1, where the plating efficiency is based on a pH level of an electrolyte of the flow battery.

7. The method of claim 1, where the flow battery is responsive to a microgrid controller.

8. The method of claim 1, wherein the flow battery includes a plating electrolyte tank and a redox electrolyte tank, where both the plating electrolyte and the redox electrolyte use a same salt at different molar concentrations.

9. A method for determining state of charge of an iron flow battery, comprising:

adjusting operation of the iron flow battery via a controller according to a result of a comparison of a difference between a first state of charge of the iron flow battery that is determined based on a calculation with a plating efficiency of the iron flow battery and a third state of charge of the iron flow battery that is determined based on an open circuit voltage of the iron flow battery, where the iron flow battery includes a plating electrolyte tank and a redox electrolyte tank.

10. The method of claim 9, further comprising determining a second state of charge of the iron flow battery that is determined without the plating efficiency, where both a plating electrolyte and a redox electrolyte use a same salt at different molar concentrations.

11. The method of claim 10, where the second state of charge is determined based on subtracting a shunt current from a current flow of the iron flow battery.

12. The method of claim 11, further comprising determining a charging state of charge during charging of the electric energy storage device iron flow battery based on selecting a greater of the first state of charge and the second state of charge.

13. The method of claim 12, further comprising determining a discharging state of charge during discharging of the iron flow battery based on selecting a lesser of the first state of charge and the second state of charge.

14. The method of claim 9, further comprising_determining a correction factor and applying the correction factor to the first state of charge when a result of the comparison is a difference that is greater than a predetermined percentage of the third state of charge.

15. An electric power system, comprising:
an iron flow electric energy storage cell stack including a positive electrode and a negative electrode, the positive electrode in physical communication with a first electrolyte that is stored in a first tank of the system and the negative electrode in physical communication with a second electrolyte that is stored in a second tank of the system; and
a controller including executable instructions stored in non-transitory memory to determine a first state of charge based on a plating efficiency and to determine a second state of charge from other than the plating efficiency, and instructions to determine a charging state of charge by selecting a greater of the first state of charge and the second state of charge during charging of the iron flow electric energy storage cell stack.

16. The electric power system of claim 15, further comprising additional instructions to determine a discharging state of charge based on selecting a lesser of the first state of charge and the second state of charge during discharging of the iron flow electric energy storage cell stack.

17. The electric power system of claim 16, further comprising additional instructions to multiply the plating efficiency and current of the iron flow electric energy storage cell stack.

18. The electric power system of claim 15, further comprising additional instructions to determine a correction factor from the charging state of charge and an open circuit state of charge estimate.

19. The electric power system of claim 18, further comprising additional instructions to multiply the correction factor and the charging state of charge.

20. The electric power system of claim 15, where the iron flow electric energy storage cell stack includes a membrane that physically separates and isolates the first electrolyte from the second electrolyte.

* * * * *